United States Patent
Bechtel et al.

(10) Patent No.: US 9,285,966 B2
(45) Date of Patent: Mar. 15, 2016

(54) MESSAGE NOTIFICATION SYSTEM

(75) Inventors: Kay Lynn Bechtel, Martinsburg, PA (US); Robert Mark Weinstein, Plano, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 489 days.

(21) Appl. No.: 13/184,902

(22) Filed: Jul. 18, 2011

(65) Prior Publication Data

US 2013/0024779 A1    Jan. 24, 2013

(51) Int. Cl.
*G06F 3/01* (2006.01)
*G06F 3/0484* (2013.01)
*G06Q 10/10* (2012.01)
*H04L 12/58* (2006.01)

(52) U.S. Cl.
CPC .......... *G06F 3/04842* (2013.01); *G06Q 10/107* (2013.01); *H04L 51/24* (2013.01); *H04L 51/12* (2013.01)

(58) Field of Classification Search
CPC .................................. G06F 3/01; G06F 3/0484
USPC ........................................... 715/752, 747, 808
See application file for complete search history.

(56) References Cited

U.S. PATENT DOCUMENTS

| | | | | |
|---|---|---|---|---|
| 6,711,154 B1* | 3/2004 | O'Neal | ............... | H04L 12/5835 370/352 |
| 7,085,812 B1* | 8/2006 | Sherwood | ........... | H04L 12/5875 709/206 |
| 7,519,912 B2* | 4/2009 | Moody | ................. | G06F 11/302 715/751 |
| 7,619,584 B2* | 11/2009 | Wolf | ..................... | G06F 3/0489 345/1.2 |
| 7,797,421 B1* | 9/2010 | Scofield | ................ | G06F 15/173 709/203 |

(Continued)

*Primary Examiner* — Daeho Song

(57) ABSTRACT

A method and system may for notifying a user of an incoming message may include a message server configured to apply a filter to a message header of a received message. A message program may be configured to filter the message based on at least one filter, the filter being established via a filter interface and including a plurality of filter options. The message program may be configured to display at least one message indicator in a message interface in response to applying the filter options of the filter to the message.

18 Claims, 7 Drawing Sheets

(56) References Cited

U.S. PATENT DOCUMENTS

| | | | |
|---|---|---|---|
| 8,640,040 B2* | 1/2014 | Lundy | G06F 3/0237 715/772 |
| 2001/0012286 A1* | 8/2001 | Huna | H04L 12/5835 370/352 |
| 2002/0087584 A1* | 7/2002 | Hung | H04M 1/72547 |
| 2003/0018752 A1* | 1/2003 | Lowy | G06Q 30/02 709/219 |
| 2004/0019645 A1* | 1/2004 | Goodman | G06Q 10/107 709/206 |
| 2004/0128353 A1* | 7/2004 | Goodman | H04L 12/581 709/204 |
| 2004/0158574 A1* | 8/2004 | Tom | G06F 17/30867 |
| 2005/0060638 A1* | 3/2005 | Mathew | G06Q 10/06 715/255 |
| 2005/0075094 A1* | 4/2005 | Kundetkar | G06Q 10/107 455/412.2 |
| 2005/0120306 A1* | 6/2005 | Klassen et al. | 715/765 |
| 2005/0166154 A1* | 7/2005 | Wilson | G06F 3/0481 715/751 |
| 2005/0251571 A1* | 11/2005 | Karstens | H04L 43/0817 709/224 |
| 2006/0020666 A1* | 1/2006 | Lai | H04L 51/14 709/206 |
| 2006/0178900 A1* | 8/2006 | Shilo | G06F 17/3089 705/1.1 |
| 2006/0184632 A1* | 8/2006 | Marino | G06F 21/56 709/206 |
| 2007/0001806 A1* | 1/2007 | Poll | G06F 9/542 340/7.59 |
| 2007/0293206 A1* | 12/2007 | Lund | H04M 3/42068 455/415 |
| 2008/0014910 A1* | 1/2008 | Hsu | H04L 12/585 455/414.2 |
| 2008/0167005 A1* | 7/2008 | Gilzean | G06Q 10/10 455/412.2 |
| 2008/0243625 A1* | 10/2008 | Adkisson | G06Q 20/20 705/16 |
| 2008/0295000 A1* | 11/2008 | Kieselbach | G06Q 10/00 715/752 |
| 2009/0054038 A1* | 2/2009 | Ranjan | G06F 21/6209 455/412.1 |
| 2009/0249247 A1* | 10/2009 | Tseng | H04M 1/72552 715/808 |
| 2009/0271735 A1* | 10/2009 | Anderson | G06F 9/4443 715/815 |
| 2010/0156806 A1* | 6/2010 | Stallings | G06F 3/04883 345/173 |
| 2010/0180001 A1* | 7/2010 | Hardt | G06F 11/32 709/207 |
| 2010/0185665 A1* | 7/2010 | Horn | G06Q 10/107 707/769 |
| 2011/0066973 A1* | 3/2011 | Plom | G06F 11/323 715/808 |
| 2011/0099473 A1* | 4/2011 | Son | G06F 3/04883 715/704 |
| 2012/0302256 A1* | 11/2012 | Pai | H04W 4/02 455/456.2 |
| 2012/0302258 A1* | 11/2012 | Pai | H04W 4/02 455/456.2 |
| 2012/0322470 A1* | 12/2012 | Said | G06Q 10/107 455/466 |

* cited by examiner

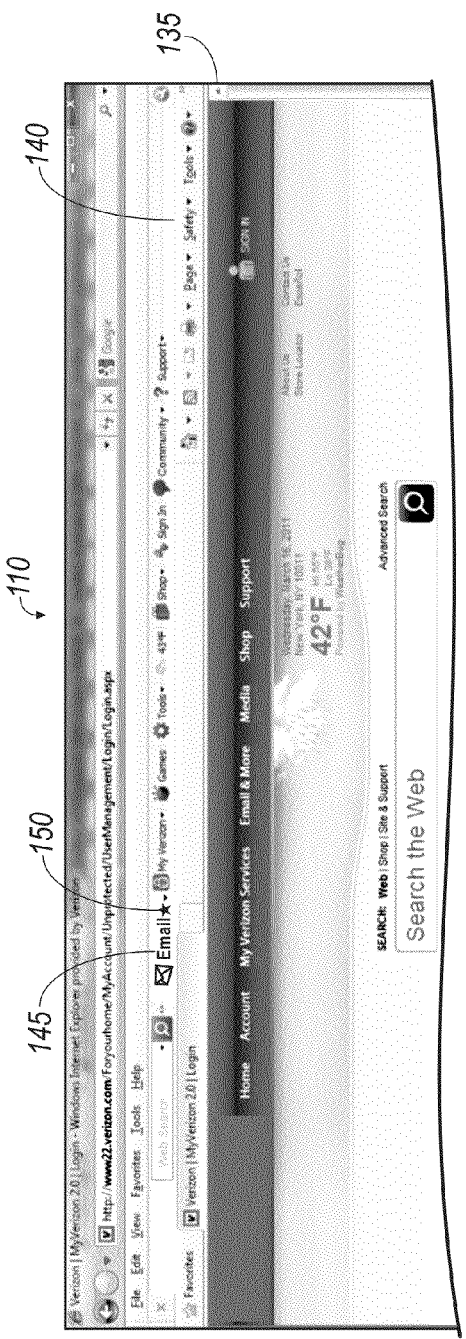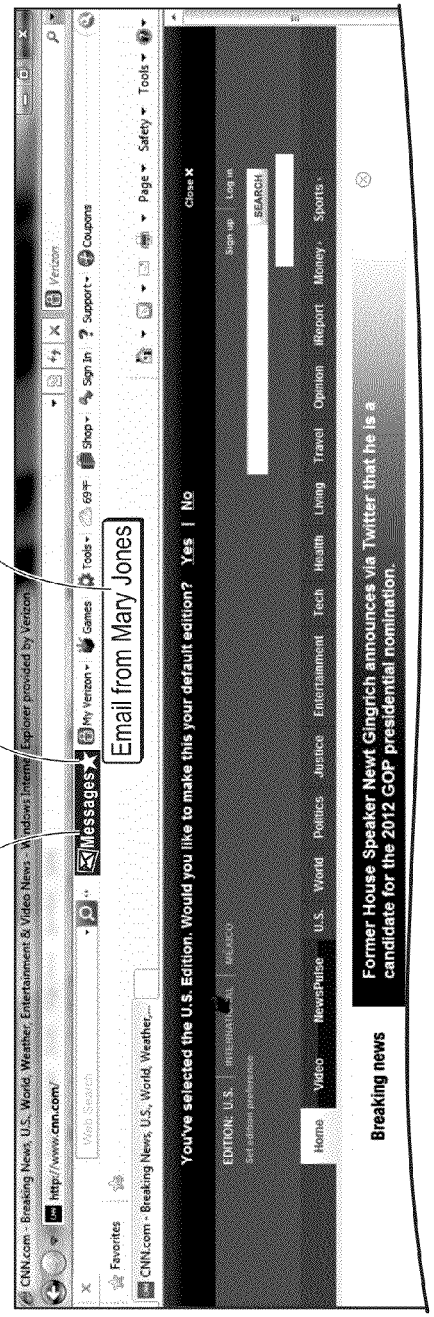
FIG. 2
FIG. 3

Return-Path: <example_from@verizon.com>
X-SpamCatcher-Score: 1 [X]
Received: from [136.167.40.119] (example@verizon.com)
   by fe3.verizon.com (CommuniGate Pro SMTP 4.1.8)
   with ESMTP-TLS id 61258719 for
example_to@mail.verizon.com; Mon, 23 Aug 2004 11:40:10 -0400
Message-ID: <4129F3CA.2020509@verizon.com>
Date: Mon, 23 Aug 2005 11:40:36 -0400  ← 405
From: Taylor Evans <example_from@verizon.com> ← 410
User-Agent: Mozilla/5.0 (Windows; U; Windows NT 5.1; en-US;
rv:1.0.1) Gecko/20020823 Netscape/7.0
X-Accept-Language: en-us, en
MIME-Version: 1.0
To: Jon Smith <example_to@verizon.com>  ← 415
Subject: Business Development Meeting  ← 420
Content-Type: text/plain; charset=us-ascii; format=flowed
Content-Transfer-Encoding: 7bit
X-Priority: High  ← 425
X-MS-Has-Attach: Yes ← 435
X-Flag: Follow Up ← 440

MESSAGE NOTIFICATION SYSTEM

BACKGROUND

Email interfaces may display, at a user device, email messages received at a message server. Some interfaces display only a portion of the email message. This allows a user to gain information about the message without opening the entire message, which takes time and resources. Often when an email message is open other messages as well as other content, such as that of a web browser, cannot be displayed. Moreover, when an email system receives a new message the email interface may alert a user, via the interface, of the new message. However, it may be beneficial to receive notifications of a new message when interfaces other than the email interface are active. Thus, a better system for informing a user of a new message is needed.

BRIEF DESCRIPTION OF THE DRAWINGS

FIG. 2 illustrates an exemplary toolbar interface;

FIG. 3 illustrates another exemplary toolbar interface;

FIG. 4 illustrates an exemplary message header;

DETAILED DESCRIPTION

A notification system may include a client device configured to display an interface. The client device may be in communication with an application program interface (API) and a database. The API may communicate with a message server, which receives incoming email messages. The user, via the interface, may create and save filters that define certain filter parameters. The filters are applied to the headers of the incoming messages, and based on the filter parameters, the interface may be updated to indicate that a new message has been received that meets the criteria established by the user. The interface may be a dynamically updating toolbar of a web browser allowing a user to receive notification of new messages without deviating from the web browser. Moreover, the user may select specific criteria by establishing filter parameters that the email message must meet before alerting the user to the new message. As a result, the user is only notified, via the toolbar, of important or relevant emails without being diverted from the web browser by irrelevant messages, unsolicited bulk email (UBE) or spam.

Figure 1:
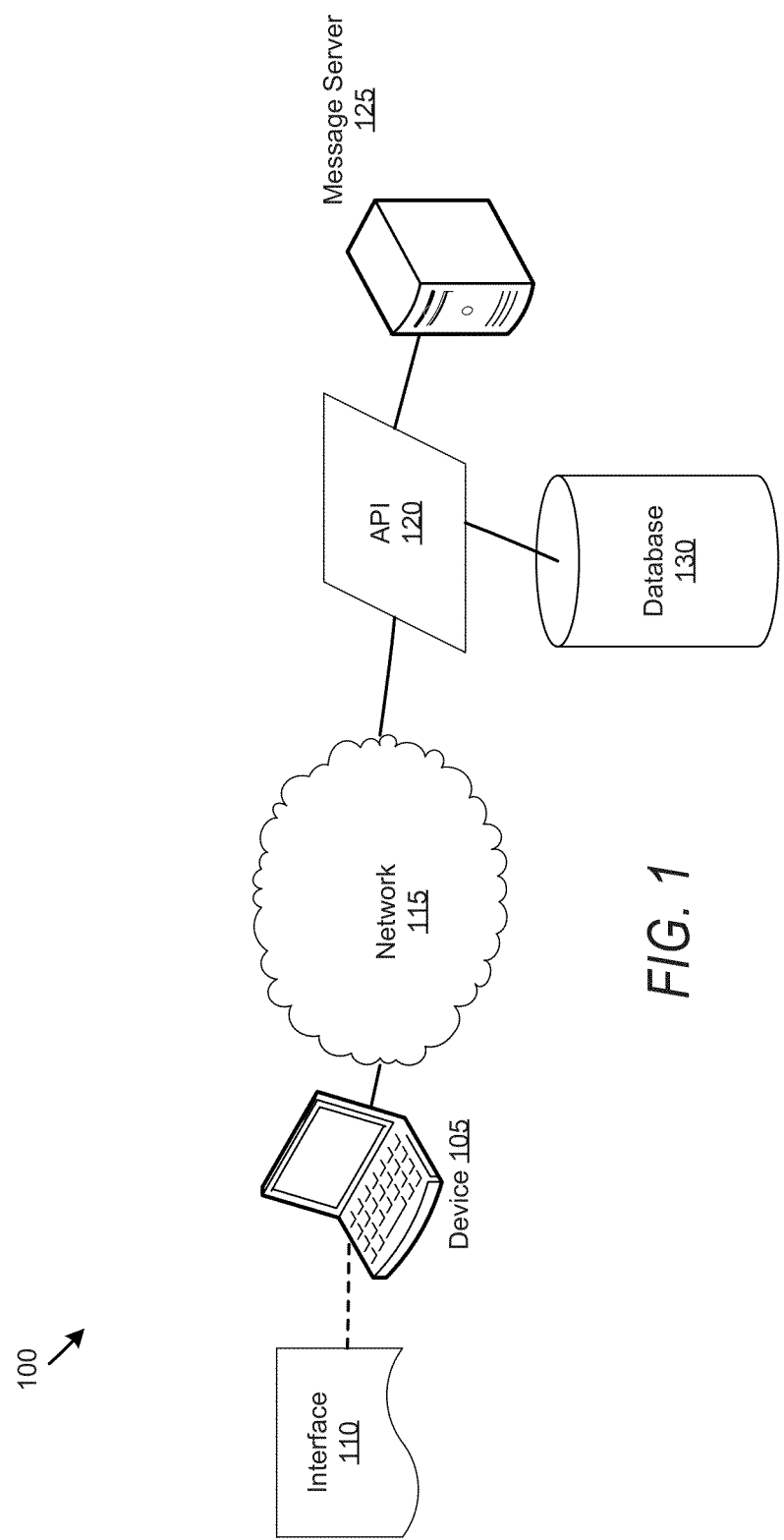
FIG. 1 illustrates an exemplary message notification system.

As illustrated in FIG. 1, a notification system 100 generally includes one or more client computing devices 105. An interface 110 may be used for a client device 105 to display a message notification indicating that a user of the client device 105 has received a message. The client device 105 may communicate, generally via network 115, with a message program such as an application program interface (API) 120. A message may be supplied to the API 120 from a message server 125. A database 130 may be communicatively coupled to the API 120 and may transfer data, such as message filters to the API 120.

The client device 105 may be a single computing device, or one of multiple computing devices, having a processor for executing computer-executable instructions, and a memory and/or other computer readable media for storing data and computer-executable instructions. For example, client device 105 may be a smart phone, personal digital assistant, laptop computer, desktop computer, tablet computer, etc. Instructions included in client device 105 may include instructions for displaying data, i.e., in the form of message notifications on the interface 110.

Interface 110 is generally a graphical user interface (GUI) displayed on a screen of a client device 105. An exemplary interface 110 may be similar to the one shown in FIG. 2 and may include one or more toolbars 140 in a browser window 135. One toolbar 140 may include a message block 145 having a new message indicator 150 to alert a user that a new message has been received without the user having to navigate away from the browser window 135. The interface 110 may be updated on a real-time basis or substantially real-time basis. FIG. 2 is just one example of the interface 110 and other examples may be found FIG. 3 and FIG. 6.

Returning to FIG. 1, network 115 is generally a packet network such as an internet protocol (IP) network. As such, network 115 generally uses one or more known protocols for transporting data, such as user datagram protocol (UDP), transport control protocol (TCP), hypertext transfer protocol (HTTP), etc. Further, network 115 may include a variety of networks such as a wide area network (WAN), e.g., the Internet, a local area network (LAN), etc.

Message API 120 may be a software program configured to facilitate interaction between the interface 110 and the message server 125. The API 120 may communicate with the message server 125 and interface 110 so that the interface 110 may be updated with the appropriate message indicator 150 when a message is received at the message server 125 meeting the criteria set forth in the filter. Moreover, the API may interact with the database as described herein. The API 120 may also be in communication with the message interface (not shown). The message interface is a platform-independent or programming-language-independent interface, presented to the user for exchanging messages. It is the visual interface shown to read, draft, send, receive and organize, email messages.

Message Server 125 may be one or more computing devices, each having a processor for executing computer-executable instructions, and a memory and/or other computer readable media for storing data and computer-executable instructions. Instructions included on message server 125 generally include instructions for receiving data such as email messages. As explained, the message server 125 may interact with the client device 105 via the API 120 to alert the user via the interface 110 of a new email message.

Database 130 generally includes data related to the filtering of the messages received by the message server 125. For example, via the interface 110, a user may establish a set of filter parameters for evaluating incoming messages at the message server 125. The user may then be alerted as to incoming messages that fit within the defined filter parameters. The database 130 may include saved filters previously defined by a user. For example, a user may save several filters, each with differing filter parameters. Depending on the current preferences of the user, the user may select different filters at different times. For example, if user is concerned only with a certain project on Monday, the user may save a filter as "Monday's Deadlines," or as "XYZ Project." The saved filters may be retrieved or modified via the interface 110.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language.

The filters saved in database 130 may define specific criteria, such as senders, recipients, text within the subject line, priority, etc. Thus, anytime a filter is applied, only messages meeting the specific filter requirements will trigger the interface 110 to be updated. Additionally or alternatively, a default filter may also be saved in database 130. Thus, if no filters are to be applied to incoming messages, then the default filter may automatically be applied. For example, the default filter may update the interface 110 with messages which are tagged as high priority. The default rule may be established by the user via the interface 110. The API 120 may also include a default rule to be applied in the absence of a user defined one.

Database 130 is generally in communication with API 120 through a local area network (LAN) or some other network, such as network 115. The database 130 may also be part of the message server 125 or the user device 105.

Computing devices such as user device 105 and message server 125, etc. may employ any of a number of computer operating systems known to those skilled in the art, including, but by no means limited to, known versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as the foregoing generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

FIG. 2 illustrates an exemplary interface 110 including a toolbar 140 having a message block 145. The message indicator 150 may indicate that a message has been received at the message server 125. The message indicator 150 may be an icon, as shown. Additionally or alternatively, the message indicator 150 may be a sound, a mouse over display, a textual display, etc. The message indicator 150 may be displayed in response to the message meeting the filter parameters established by the user. The filter is applied to incoming messages via the API 120. The API 120 may search the filter header and in response to a header field of a message including information meeting the established parameters, the interface 110 may be updated. Thus, the toolbar 140 is dynamically updated via the message indicator 150 whenever a qualifying message is received at the message server 125. If an incoming message does not include information meeting the filter parameters, the interface 110 may remain unchanged. Notably, the incoming message will still be delivered to the email systems' interface so that it may eventually be received and viewed by the user. The message will not, however, cause the interface 110 to be updated and thus alert the user to its arrival.

FIG. 3 illustrates another exemplary interface 110 wherein the message indicator 150 also includes a text representation 155 of the incoming message. Specifically, as shown, the text representation 155 identifies the sender of the message. This representation 155 may be displayed automatically upon receiving a qualifying message at the message server 125. The representation 155 may also be a mouse-over representation in which it is only displayed when a user's mouse curser is placed over the message block 145. The message indicator 150 may also be displayed automatically regardless of the mouse-over. A message indicator 150 may alert a user to the fact that a new message has been received as well as information about that message, i.e., the identity of the sender or subject line. The text representation 155 may include any type of information available from the incoming message such as the priority, size, message content, etc.

FIG. 4 is an exemplary email header 400. Generally, an email header precedes the body of an email and identifies particular routing information relating to the message. For example, the header 400 may include header fields such as the date 404, the sender 410, the recipient 415, the subject line 420, the priority 425, and the size 430 of the email message. The header 400 may also include whether there is an attachment 435 and a flag 440. Some of the routing information is created when the message was created, such as the subject line 420, sender 410 and recipient 415. Other information, such as the date and time 405 is added to the header by a mail transfer agent (MTA) whenever the message is sent or received. The message API 120 may filter the messages based on the information in the header 400. For example, if a user only wishes to receive notifications of emails sent to the user from a specific sender, the API 120 would read the header of incoming messages and filter the emails based on the sender field 410.

Figure 5:
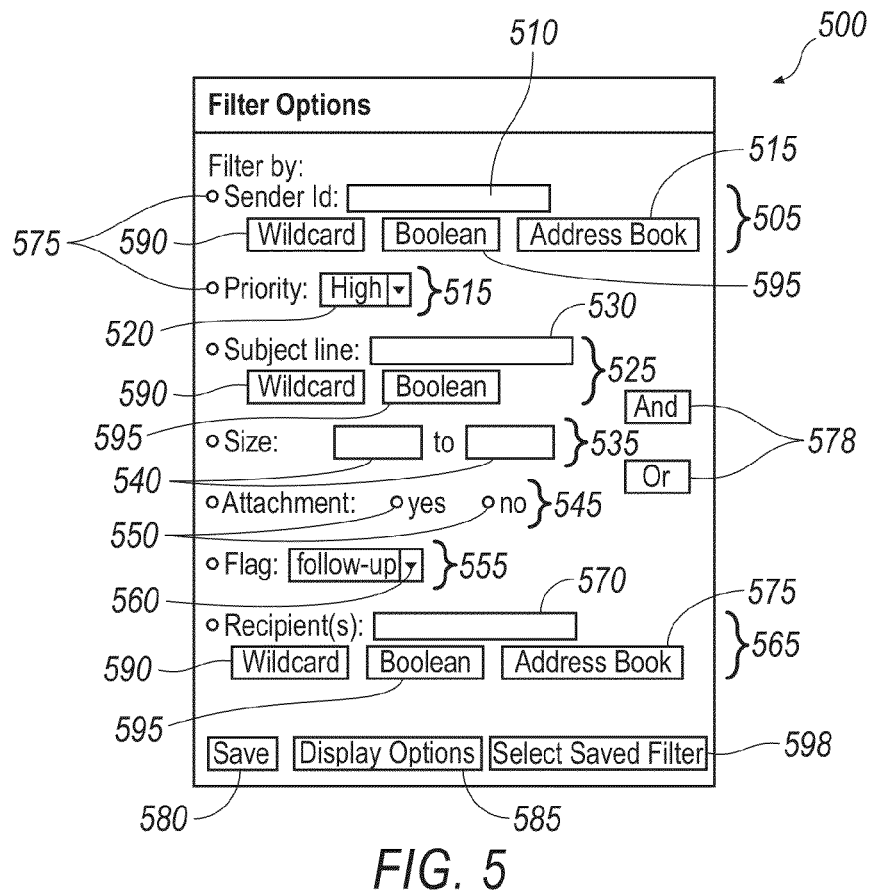
FIG. 5 illustrates an exemplary interface for establishing filter options.

A user may initiate and generate a filter from the message block 145 in the toolbar 140, as shown by way of example in FIG. 2. By selecting the message block 145, a filter interface such as filter option block 500 may be presented. FIG. 5 shows an exemplary filter option block 500 including a plurality of filter options having one, or a plurality of filter parameters. The filter parameters define the specific criteria that a message must meet before the interface 110 is updated. For example, the interface 110 and the message notification 150 may only be updated when a message is received from a specific sender. A sender filter 505 may identify a sender by the sender name, email address, phone number, etc. The user may specify the identification of the sender in a sender text block 510, or may select the sender from the user's address book by selecting the address book button 515. Moreover, wildcards may be used. For example, "Elliot Smith" could be represented by entering "Ell? Smith." Boolean operators such as "AND" and "OR" may also be used to identify a sender. For example, the sender could be identified by entering "(Eli OR Elliot) AND Smith." The sender of a message may be identified by reading the sender field 410 of the message header 400. Thus, any messages including Elliot Smith in the sender field 410 may update the toolbar 140.

In another example, a filter may include a priority filter 515 wherein a priority drop down menu 520 is presented. The priority drop down menu 520 may include several levels of priority typically included in an email header such as "high" and "low" priority. These levels are typically included in the message header in the priority field 425. Further, a subject filter 525 may allow a filter to evaluate a message based on the subject of the message. The subject filter 525 may include a subject text block 530 in which a user may enter certain words or phrases. By entering a word or phrase, the user may choose to filter messages based on those words being included in the subject field 420 of the message header 400. Similar to the sender text block, wildcard characters and Boolean operators may also be used.

A size filter 535 may also be implemented in which the size of a message may be used to filter incoming messages. This may be done by reading the size field 430 of the message header. A specific size may be entered into the filter options block 500. An upper and lower bounds may also be entered in size text blocks 540. A message may also be filtered based on whether or not the message includes an attachment. An attachment filter 545 may include attachment option selections 550 in which only messages with or without attachments may result in the interface 110 being updated. Additionally or alternatively, a text block (not shown) could be included in the attachment filter 545 allowing a user to enter the specific number of attachments, or even the specific size of an attachment. Moreover, if a user is indifferent as to the attachment options, neither of the attachment option selections 550 may be selected.

A flag filter 555 may also be presented and may include a flag drop down menu 560. The drop down menu 560 may include several types of flags typically included in an email message such as "follow up," "for your information," "reply all," "please forward," etc. These flags may be indicated in the message header 400, i.e., the flag field 440. A recipient filter 565 may also be presented and function similar to the sender filter 505. Specific recipients may be identified by name or email address in recipient text block 570. Recipients may be selected from an address book 575. This filter parameter may be utilized when a user wishes to only be alerted as to new messages when they are sent to a specific person or group. For example, a user may only wish to be alerted to emails sent to a specific email address, such as their home or work email. Moreover, a filter may be established to only alert users as to emails sent to a specific group, such as the "XYZ Project Group." Again, wildcard characters and Boolean operators may be implemented. Moreover, several recipients may be listed and separated by semicolons. Other parameters may also be used to establish the filter such as date, format, content type, IP address, etc. These parameters may be included in the message header 400. Note that the message header 400 is only an exemplary header is does not provide an exhaustive list of possible filter parameters.

At least one wildcard button 590 and Boolean button 595 may be displayed with respect to the filter options. These buttons may display information about certain inputs such as the wildcard characters and Boolean operators that may be used in the text blocks described herein. For example, the Boolean button may display a list of Boolean operators with their corresponding function such as "&" means "AND." The wildcard button may display a list of wildcard characters such as "?" means "any character" and "w/#" means "within # number of words," etc.

The filter options block 500 may present any of the filter options 505, 515, 525, 535, 545, 555, 565 in any order or combination. Each of the filter options 505, 515, 525, 535, 545, 555, 565 may be selected by selecting their respective selection circles 575. Any combination of the filter options 505, 515, 525, 535, 545, 555, 565 may be used to create a filter. The selection circles 575 allow for multiple filter options to be selected and applied to the filter. The selection circles 575 may be selected automatically by selecting or entering data into any portion of a respective filter option. For example, by entering a sender's email address into text block 510, the respective selection circle may be automatically selected. The selection option buttons 578 may include an 'AND' button and an 'OR' button. Selecting the 'AND' button may allow a filter to update an interface 110 in response to a message that qualifies under all of the selected filter options, or, by selecting the 'OR' button, update the interface 110 in response to a message that qualifies under any one of the selected filter options.

The filter may be saved by selecting the save button 580. The save button 580 may prompt the user to select a file name under which to save the filter under. The filter may be saved in database 130. The filter may be also saved locally at the user device 105 or at the API 120. As described herein, several filters may be created and saved. The filters may be associated with a specific user. Moreover, each filter may be accessed and modified from any of several user devices 105.

In addition to creating a new filter, a user may also select a saved filter to be applied by selecting the 'select saved filter' button 598. This button may present a saved filter list (not shown) from which a previously saved filter may be selected. Among the list may be filters previously created and established. Additionally or alternatively, a user may choose to apply multiple filters concurrently. For example, a user may implement a first filter relating to a first project and a second filter relating to a second project. If a user is concerned with messages only related to the first project, the first filter may be applied. If a user is concerned with both projects then both of the respective filters may be applied.

The user may also customize how the message notification is displayed on the interface 110 in response to receiving a qualifying message. The display options block 600 may be displayed upon the selection of the display options button 585. Additionally or alternatively, the display options block 600 may appear concurrently with the filter options block 500, or as part of the filter options block.

Figure 6:
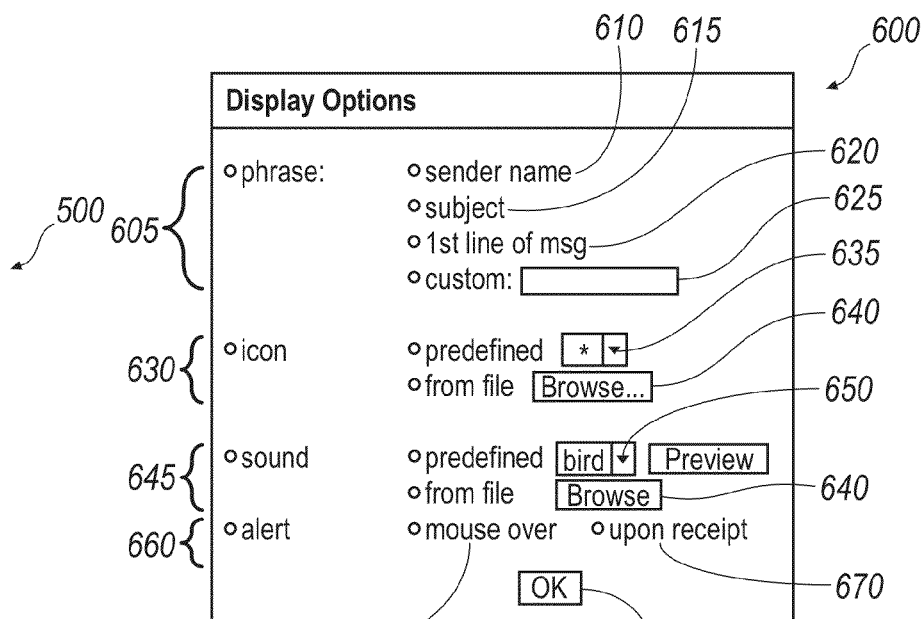
FIG. 6 illustrates an exemplary interface for establishing display options.

As shown in FIG. 6, the display options block 600 includes display options such as a phrase option 605. The phrase option 605 may include options to display a phrase such as the sender name 610, the subject line 615, and the first line of a message 620. This phrase may be displayed as the text representation 155 described herein. Additionally, other options may be displayed such as the date and time, the priority, the recipient name, the attachment name, etc. The user may also enter a custom message in the custom message text block 625. This could include a phrase that is displayed when the interface 110 is updated. For example, the phrase "Email about XYZ Project" may be displayed when an email message is received and meets the criteria of the "XYZ Filter." Thus, an easy to read and understand phrase may be displayed when a qualifying message is received. Alternatively or additionally, information read straight from the message header 400 may be displayed, such as the subject of message from the subject field 420.

An icon option 630 may allow a user to select what type of icon, if any, is displayed as part of the message indicator 150. A predefined drop down list 635 may be presented from which a plurality of icons, such as bulleted icons, may be selected from. User may also select an icon or image from a file using the file option 640. For example, a photo of the sender may be selected and displayed upon receiving a message from that particular sender.

Additionally or alternatively, a sound option 645 may be selected. A sound may be played from the user device's speakers as part of the message notification. A sound drop down menu 650 may be presented to present a plurality of predefined sound bits such as a door bell or phone ringing. Moreover, similar to the icon option 630, a file option 640 is again presented to allow for a custom sound to be played as part of the message notification.

An alert option 660 may also be included in the display options block 600. It may also be part of the filter options block 500 described herein. As described above with respect to FIG. 3, a message indicator 150 may include a mouse over notification in which a portion of the message, or information about the message, may be displayed upon moving the mouse cursor over the message block 140. Additionally or alternatively, the message indicator 150 may be displayed upon receipt of the message in real-time or substantially real-time. By selecting one or both of the alert options 660, including the 'mouse over' option 665 and the 'upon receipt' option 670, the user may specify how the alerts are viewed in the interface 140. If neither of the alert options 580 is selected, a default alert option may be implemented from the API 120. For example, the message indicator 150 may be displayed within the message block 150 upon receipt of a qualifying message without displaying any portion of the message or any information about the message.

Upon selection of the OK button 680, the display options block 600 may close, revealing the filter options block 500 again. The filter options presented in the filter options block 500 may then be modified, or the filter may be saved by selecting the save button 595. The display option block 600 may also present a save button (not shown). The save button 595 may save the filter options and display options that were selected and defined in the filter options block 500 and display options block 600.

Figure 7:
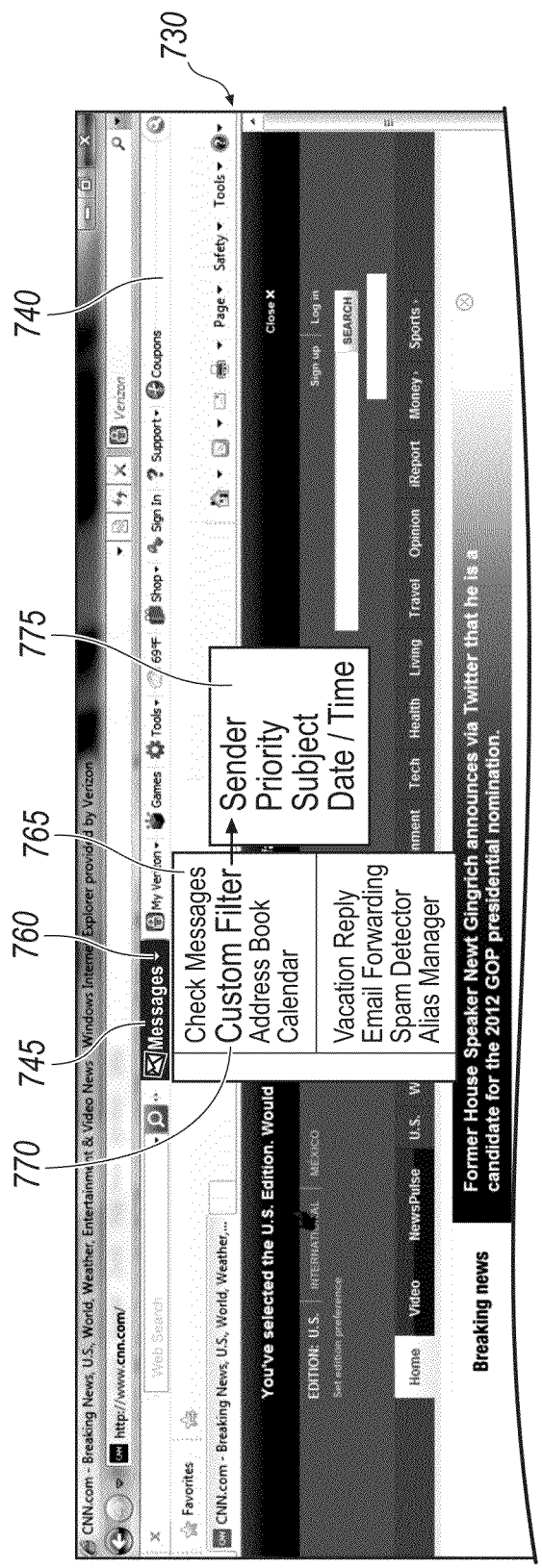
FIG. 7 illustrates another exemplary toolbar interface.

As described above, a user may initiate a filter by selecting the message block 145. FIG. 7 illustrates another exemplary interface 735 having a toolbar 740. A message block 745 may be part of the toolbar 740 and may include an arrow 760. The arrow 760 may display a drop down menu 765 when selected. The drop down menu 765 may present several message functions that may include "check messages," "compose messages," "address book," "calendar," "vacation reply," "email forwarding," among others. The message functions may also include a custom filter option 770. The custom filter option 770, when selected, may display a filter options menu 775. The filter options menu 775 may form the filter interface by may displaying several filter options for establishing a filter for incoming messages similar to those displayed in FIG. 5. For example, messages may be filtered by sender, by priority, by subject line, by date and time, etc.

Figure 8:
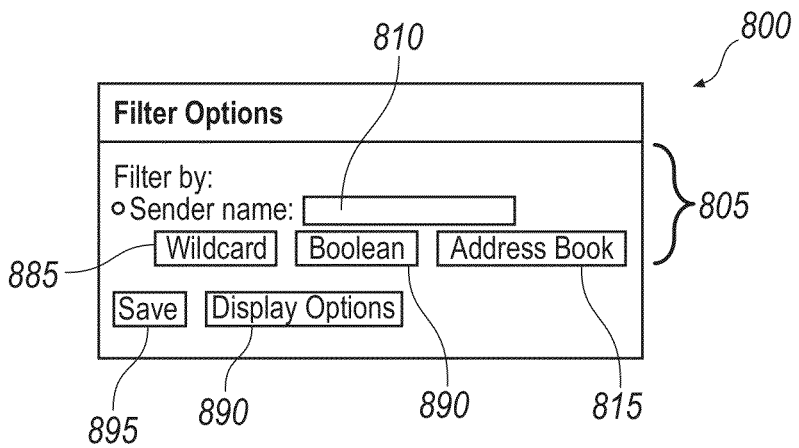
FIG. 8 illustrates another exemplary interface for establishing filter options.

Upon selecting any of the listed filter options in filter menu 775, a filter options block 800 may be presented. The filter option block 800 may be similar to the second filter option block 500 in that it presents the same options for establishing the filter parameters. The second filter option block 800 may present only those options available for a specific type of filter, such as a sender filter 805, as shown in FIG. 8. The sender filter 805 may be similar to the sender filter 505. The user may specify the identification of the sender in a sender text block 810, or may select the sender from the user's address book by selecting the address book button 815. Moreover, wildcard and Boolean characters may be used. Lookups for these characters may be presented by selecting the wildcard button 885 and the Boolean button 890. This is just an example of one possible second filter option block 800 selected from the filter menu 775 in FIG. 7. The second filter option block 800 may present any filter option including, but not limited to, a priority option, a subject line option and a date and time option. Moreover, the filter option block 800 may include more than one filter option. For example, the sender filter 805 and a filter similar to that of the priority filter 515 may both be included in the second filter option block 800.

Figure 9:
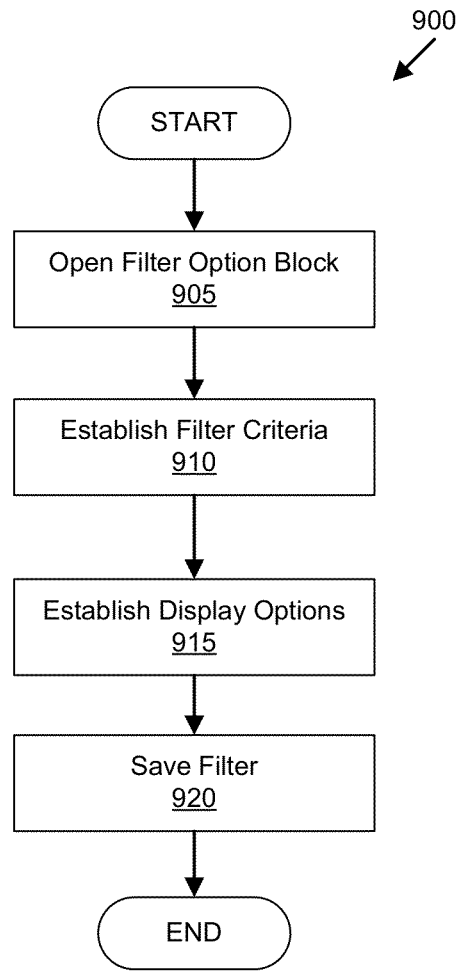
FIG. 9 illustrates a flow chart for establishing message filters.

FIG. 9 illustrates an exemplary process 900 by which filters are established.

In block 905 a filter option block is presented. An exemplary filter option block may be one of filter option block 500 or the second filter option block 800 as described herein. As explained, the filter option block may be presented in response to selection of the message block 145 or selection of specific filter option on the filter option menu 775.

Next, in block 910, filter criteria is established via the filter option block. The filter option block may present filter options and parameters such as those shown in FIG. 5. Each filter option may operate alone, or in conjunction with other filter options. For example, a user may select to filter incoming messages by the priority of the message as well as the size of the message. These filter parameters may be established by selecting the corresponding option circles, filing in the appropriate text blocks, or selecting an option from the drop down menus.

Next, in block 915, display options for the filter may be established. The display options may be selected via a display options window such as the one shown in FIG. 6. As explained, these options allow the user to select how he or she is alerted to a new message.

Next, in block 920, the filter may be saved. By saving the filter, the specific parameters and display options established in blocks 915 and 920 may be recalled and used again at another point in time. For example, a user may wish to filter incoming messages based on a set of filter parameters in different ways, at different times, depending on the situation. If a user works on a certain project every Monday, that user may wish to save a filter as "Monday's Filter" so that the user is only alerted to incoming messages qualifying under that filter. However, once the user is completed with the project, a user may wish to return to receiving notifications of all messages, and thus the filter may be turned off. The filters may be saved in database 130. They may be indexed according to any number of factors including name, date and time created, etc.

Figure 10:
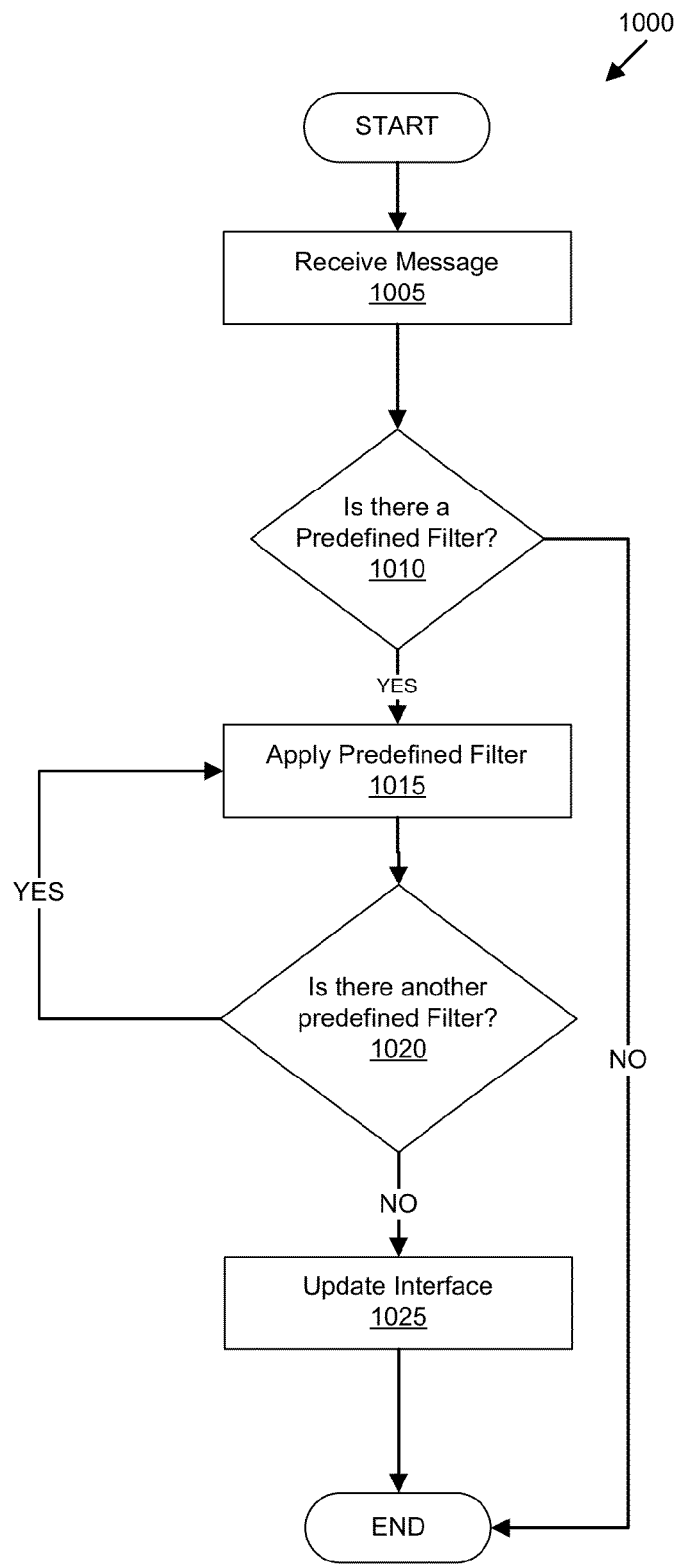
FIG. 10 illustrates a flow chart for processing a message based on at least one filter.

FIG. 10 illustrates an exemplary process 1000 by which filters are applied to incoming messages. In block 1005, a message is received at the message server 125. This message may be an email message having an email header such as that shown in FIG. 4.

Next, in block 1010, the message server 125 interacts with the API 120 to determine if a saved filter is to be applied. A saved filter may be selected from the saved filter list, or the saved filter may be the current filter that is in use during the current web session.

Next, in block 1015, the filter is applied to the message. The API 120 may search the message header 400 of the message to determine if specific filter parameters are met. The API 120 may search the header lines of the header 400 in a specific order as part of a default rule in the API 120. For example, the API 120 may search the subject line 405 of the header 400 depending on the filter parameter. Specifically, if one of the filter parameters is a subject line including the phrase "XYZ Project," the API 120 may search the subject line 420 for the phrase.

Next, in block 1020, the message server 125 interacts with the API 120 to determine if another filter is to be applied to the message. As explained herein, multiple filters can be applied concurrently. If there is no other filter, the process proceeds to block 1025. If there is another filter to apply, the process proceeds to block 1015.

In block 1025, the API 120 may interact with the client device 105 to update the toolbar 140 on interface 110. For example, the message indicator 150 in message block 145 may be updated to change shape, color, etc. Additionally or alternatively the message indicator may blink or perform some other animation. Moreover, a text representation 155 may be displayed, as described herein. If more than one filter is applied to the message, the toolbar 140 may be updated differently depending on the applied filters. For example, if one filter was established for a first project, and a second filter was established for a second project, the message indicator 150 may differ depending on the filter. Filter one may be associated with a red star, whereas filter two may be associated with a blue circle. Thus, when message indicator 150 is updated on the toolbar 140, indicating a new message has been received at the message server 125, a user may be alerted to whether the message met the parameters of the first filter, the second filter, or both based on the appearance of the message indicator 150.

Once the toolbar 140 is updated via message indicator 150, the toolbar 140 may remain unchanged until another qualifying message is received. Additionally, the message indicator 150 may be updated, changed, removed, etc., after a specific amount of time has lapsed. The API 120 may also be in communication with the message interface (not shown). The API 120 may determine if the message has been opened at the message interface, and if so, may update the message indicator 150. Thus, once a message has been read, there is no longer a need for the user to be alerted and the message indicator 150 may return to its normal appearance.

The toolbar 140 may also display multiple message indicators 150. Thus, even if a new qualifying message is received just moments after another one has been received, the message indicator corresponding to the new qualifying message will not overwrite the former message indicator and the user may still be notified as to the two messages. A certain message indicator 150 may be removed from the toolbar 140 upon the user selecting the indicator 150, or some other predetermined action such as a predetermine number of indicators being reached, eliminating the indicator 150 representing the oldest qualifying message. Thus, messages indicators 150 may remain on the toolbar 140 until they are cleared by the user, or some other predetermined event occurs.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A notification system comprising:
   a message server having a processor configured to send and receive electronic messages, each of the electronic messages having a message header; and
   an application program interface configured to communicate with the message server, with a message interface, and with a notification interface,
   wherein the application program interface is configured to provide functions allowing a user to, via the message interface, read, draft, and send the electronic messages,
   wherein the application program interface is configured to apply first and second filters to the message header of at least a portion of the electronic messages received by the message server thereby resulting in respective first and second filtered messages and to cause the notification interface to display first and second graphical indicators having different shapes and colors for the respective first and second filtered messages based on the application of the respective first and second filters,
   wherein the notification interface is part of a toolbar that is different from the message interface and is configured to display the first and second graphical indicators in response to the first and second filtered messages, regardless of whether the message interface is activated, wherein the notification interface is configured to change the shape or color of the at least one of the first and second graphical indicators based on at least one newly filtered message from one of the first and second filtered messages, wherein the application program interface is configured to provide functions allowing the user to concurrently select, via the notification interface as part of the toolbar, a different type for each of the first and second graphical indicators from first and second graphical indicator types for each of the respective first and second filters, and wherein the first graphical indicator type is displayed as part of the toolbar in response to filtered messages associated with the first filter and the second graphical indicator type is displayed concurrently as part of the toolbar in response to filtered messages associated with the second filter.

2. The notification system of claim 1,
wherein the toolbar is included in the display of a general-purpose web browser such that at least one of the first and second graphical indicators is displayable regardless of a webpage being currently displayed by the web browser.

3. The notification system of claim 1,
wherein the application program interface is configured to provide functions allowing the user to select, via the notification interface, at least one of the first and second filters from among a plurality of filter options.

4. The notification system of claim 3,
wherein each of the filter options includes a filter parameter corresponding to at least a portion of the message header, and
the application program interface is configured to cause the notification interface to display at least one of the first and second graphical indicators for those of the first and second filtered messages whose message header matches the filter parameter of at least one of the first and second filters and to cause the notification interface to not display the at least one of the first and second graphical indicators for those of the first and second filtered messages whose message header does not match the filter parameter of the at least one of the first and second filters.

5. The notification system of claim 4, wherein the application program interface is configured to, via the message interface, update a previously displayed graphical indicator in response to the newly filtered message whose message header matches the filter parameter of the at least one filter.

6. The notification system of claim 4, wherein, when a portion of the message header of at least one of the received messages being filtered matches the filter parameter of at least one of the first and second filters and at least one of the first and second graphical indicators displayed by the notification interface includes information contained in the portion of the message header.

7. The notification system of claim 1, further comprising:
a database configured to communicate with the application program interface and to store at least one of the first and second filters.

8. The notification system of claim 1,
wherein the message server is an email server and the electronic messages are email messages.

9. The notification system of claim 1, wherein the application program interface is configured to provide functions allowing the user to select, via the notification interface, a type of at least one of the first and second graphical indicators from among more than one graphical indicator type options.

10. A method comprising:
causing a message server to receive electronic messages, each of the electronic messages having a message header;
causing a processor to apply first and second filters to the message headers of the received messages thereby resulting in first and second filtered messages; and
causing the processor to display, via a notification interface, first and second graphical indicators having different shapes and colors for the respective first and second filtered messages based on the application of the respective first and second filters, at least one of the first and second graphical indicators being for displaying at least one of a priority, size, and message content from the filtered message only when at least one portion of the message header matches a filter parameter of at least one of the applied first and second filters,
wherein the notification interface is part of a toolbar that is different from a message interface that is used by the processor to provide functions allowing a user to read, draft, and send at least one of the electronic messages,
wherein the first and second graphical indicators are displayed by the notification interface in response to the first and second filtered messages, regardless of whether the message interface is activated,
wherein the shape or color of at least one of the first and second graphical indicators is changed by the notification interface based on at least one newly filtered message from one of the first and second filtered messages,
wherein the notification interface, as part of the toolbar, provides functions allowing the user to concurrently select a different type for each of the first and second graphical indicators from first and second graphical indicator types for each of the respective first and second filters, and
wherein the first graphical indicator type is displayed as part of the toolbar in response to filtered messages associated with the first filter and the second graphical indicator type is displayed concurrently as part of the toolbar in response to filtered messages associated with the second filter.

11. The method of claim 10, wherein the toolbar is included in the display of a general-purpose web browser such that at least one of the first and second graphical indicators is displayable regardless of a webpage being currently displayed by the web browser.

12. The method of claim 10, further comprising:
allowing the user to select, via the notification interface, at least one of the first and second filters from among a plurality of filter options.

13. The method of claim 10, further comprising:
causing the processor to update, via the message interface, a previously displayed graphical indicator in response to the newly filtered message whose message header matches the filter parameter of at least one of the first and second filters.

14. The method of claim 13,
wherein, when a portion of the message header of at least one of the received messages matches the filter parameter of at least one of the first and second filters and at least one of the first and second graphical indicators being displayed by the notification interface includes information contained in the portion of the message header.

15. The method of claim 10, further comprising:
causing the processor to provide functions allowing the user to select, via the notification interface, a type of at least one of the first and second graphical indicators from among a plurality of graphical indicator type options.

16. A non-transitory computer readable medium tangibly embodying computer-executable instructions, the instructions being executable by a processor to cause the processor to:
apply first and second filters to message headers of electronic messages received by a message server thereby resulting in first and second filtered messages;
display, via a notification interface, first and second graphical indicators having different shapes and colors for the respective first and second filtered messages based on the applied respective first and second filters, at least one of the first and second graphical indictors being displayed for at least one of the first and second filtered messages only when at least one portion of the message header matches a filter parameter of at least one of the applied first and second filters associated with a specific sender;
change, via the notification interface, a shape or color of at least one of the first and second graphical indicators based on at least one newly filtered message from one of the first and second filtered messages,
wherein the notification interface is part of a toolbar that is different from a message interface that is used by the processor to provide functions allowing a user to read, draft, and send at least one of the electronic messages,
wherein the first and second graphical indicators are displayed by the notification interface in response to the first and second filtered messages, regardless of whether the message interface is activated,
wherein the notification interface, as part of the toolbar, provides functions allowing the user to concurrently select a different type for each of the first and second graphical indicators from first and second graphical indicator types for each of the respective first and second filters, and
wherein the first graphical indicator type is displayed as part of the toolbar in response to filtered messages associated with the first filter and the second graphical indicator type is displayed concurrently as part of the toolbar in response to filtered messages associated with the second filter.

17. The non-transitory computer readable medium of claim 16,
wherein the toolbar is included in the display of a general-purpose web browser such that at least one of the first and second graphical indicators is displayable regardless of a webpage being currently displayed by the web browser.

18. The non-transitory computer readable medium of claim 16, wherein the instructions are executable by a processor to cause the processor to:
allow the user to select, via the notification interface, at least one of the first and second filters from among a plurality of filter options.

* * * * *